(12) United States Patent
Marshall

(10) Patent No.: US 7,108,228 B1
(45) Date of Patent: Sep. 19, 2006

(54) HYDROGEN-FUELED SPACECRAFT

(76) Inventor: Manfred Marshall, 111-6151 Santa Ana 2000 (CR)

( * ) Notice: Subject to any disclaimer, the term of this patent is extended or adjusted under 35 U.S.C. 154(b) by 0 days.

(21) Appl. No.: 11/049,150

(22) Filed: Feb. 2, 2005

(51) Int. Cl.
*B64C 1/00* (2006.01)

(52) U.S. Cl. .................................. 244/158.1

(58) Field of Classification Search ............ 244/173.1, 244/173.2, 173.3
See application file for complete search history.

(56) References Cited

U.S. PATENT DOCUMENTS

| | | | | | |
|---|---|---|---|---|---|
| 2,752,114 | A | * | 6/1956 | Calvy | 244/118.3 |
| 3,028,130 | A | * | 4/1962 | Burton | 244/137.1 |
| 3,128,068 | A | * | 4/1964 | Pauli | 244/129.5 |
| 3,147,942 | A | * | 9/1964 | Griffith | 244/118.3 |
| 3,836,101 | A | * | 9/1974 | Mattia et al. | 244/137.1 |
| 4,023,751 | A | * | 5/1977 | Richard | 244/23 C |
| 4,032,092 | A | * | 6/1977 | Day | 244/137.1 |
| 4,050,655 | A | * | 9/1977 | Bogue et al. | 244/137.1 |
| 4,195,693 | A | * | 4/1980 | Busch et al. | 169/53 |
| 4,214,720 | A | * | 7/1980 | DeSautel | 244/12.2 |
| 4,235,399 | A | * | 11/1980 | Shorey | 244/137.1 |
| 4,301,984 | A | * | 11/1981 | Olason, Ray | 244/137.1 |
| 4,433,819 | A | * | 2/1984 | Carrington | 244/12.2 |
| 4,457,476 | A | * | 7/1984 | Andresevitz | 244/23 C |
| 4,635,883 | A | * | 1/1987 | Hamilton et al. | 244/137.1 |
| 4,699,337 | A | * | 10/1987 | Lewis | 244/137.1 |
| 4,807,830 | A | * | 2/1989 | Horton | 244/12.2 |
| 4,832,286 | A | * | 5/1989 | Brookes | 244/118.3 |
| 4,860,973 | A | * | 8/1989 | Fenner | 244/137.1 |
| 4,901,948 | A | * | 2/1990 | Panos | 244/230 |
| 5,022,610 | A | * | 6/1991 | Ensign | 244/118.3 |
| 5,106,038 | A | * | 4/1992 | Dupont | 244/137.1 |
| 5,140,716 | A | * | 8/1992 | Rawdon et al. | 14/71.1 |
| 5,178,344 | A | * | 1/1993 | Dlouhy | 244/12.2 |
| 5,184,366 | A | * | 2/1993 | Rawdon et al. | 14/71.5 |
| 5,241,722 | A | * | 9/1993 | Rohrlick et al. | 14/71.5 |
| 5,351,911 | A | * | 10/1994 | Neumayr | 244/23 C |
| 5,380,144 | A | * | 1/1995 | Smith et al. | 414/537 |
| 5,836,542 | A | * | 11/1998 | Burns | 244/12.2 |
| 5,881,970 | A | * | 3/1999 | Whitesides | 244/23 C |
| 6,216,984 | B1 | * | 4/2001 | Brinsmade | 244/171.9 |
| 6,367,739 | B1 | * | 4/2002 | Paterro | 244/23 C |
| 6,371,406 | B1 | * | 4/2002 | Corcoran | 244/12.2 |
| 6,581,872 | B1 | * | 6/2003 | Walmsley | 244/12.2 |
| 6,595,466 | B1 | * | 7/2003 | Depeige et al. | 244/118.3 |
| 2002/0003189 | A1 | * | 1/2002 | Kuenkler | 244/26 |
| 2003/0098388 | A1 | * | 5/2003 | Walmsley | 244/12.2 |
| 2003/0127559 | A1 | * | 7/2003 | Walmsley | 244/23 C |
| 2003/0213870 | A1 | * | 11/2003 | Eakins et al. | 244/119 |
| 2005/0230525 | A1 | * | 10/2005 | Paterro | 244/23 B |

OTHER PUBLICATIONS

"Artificial gravity." Wikipedia, The Free Encyclopedia. Apr. 20, 2006, 04:00 UTC. Apr. 25, 2006, 16;59 <http://en.wikipedia.org.w/index.php?title=Artificial_gravity&oldid=49234977>.*

* cited by examiner

*Primary Examiner*—Teri Pham Luu
*Assistant Examiner*—S. A. Holzen
(74) *Attorney, Agent, or Firm*—Michael I. Kroll

(57) ABSTRACT

A spacecraft having facilities for carrying astronauts and payloads into the earth satellite orbit and space having a composite fiber body with a Kevlar exterior skin. Said craft having a substantially round shape with a portion covered with solar cells. Said solar cells powering electrical motors and a plurality of rockets using a quantity of hydrogen fuel.

17 Claims, 18 Drawing Sheets

SPACECRAFT SPECIFICATIONS

- LENGTH: 200 FEET
- DIAMETER: 200 FEET
- HEIGHT: 70 FEET
- GAS VOLUME: 1,242,629 CUBIC FEET
- ENGINES: 8 ELECTRIC JET ENGINES AND 8 ROCKET ENGINES
- MAXIMUM SPEED: 100 MPH IN THE ATMOSPHERE
- MAXIMUM SPEED IN SPACE 6,000 MPH
- LIFTING GAS: HYDROGEN
- GAS BAGS CONTAINING HIGHLY PRESSURIZED WATER VAPOR
- GAS BAGS FILLED WITH PURIFIED AIR WITH PURE OXYGEN
- GAS BAGS CONTAINING OXYGEN GAS
- PAYLOAD CAPACITY - 66,000 POUNDS

FIG. 7

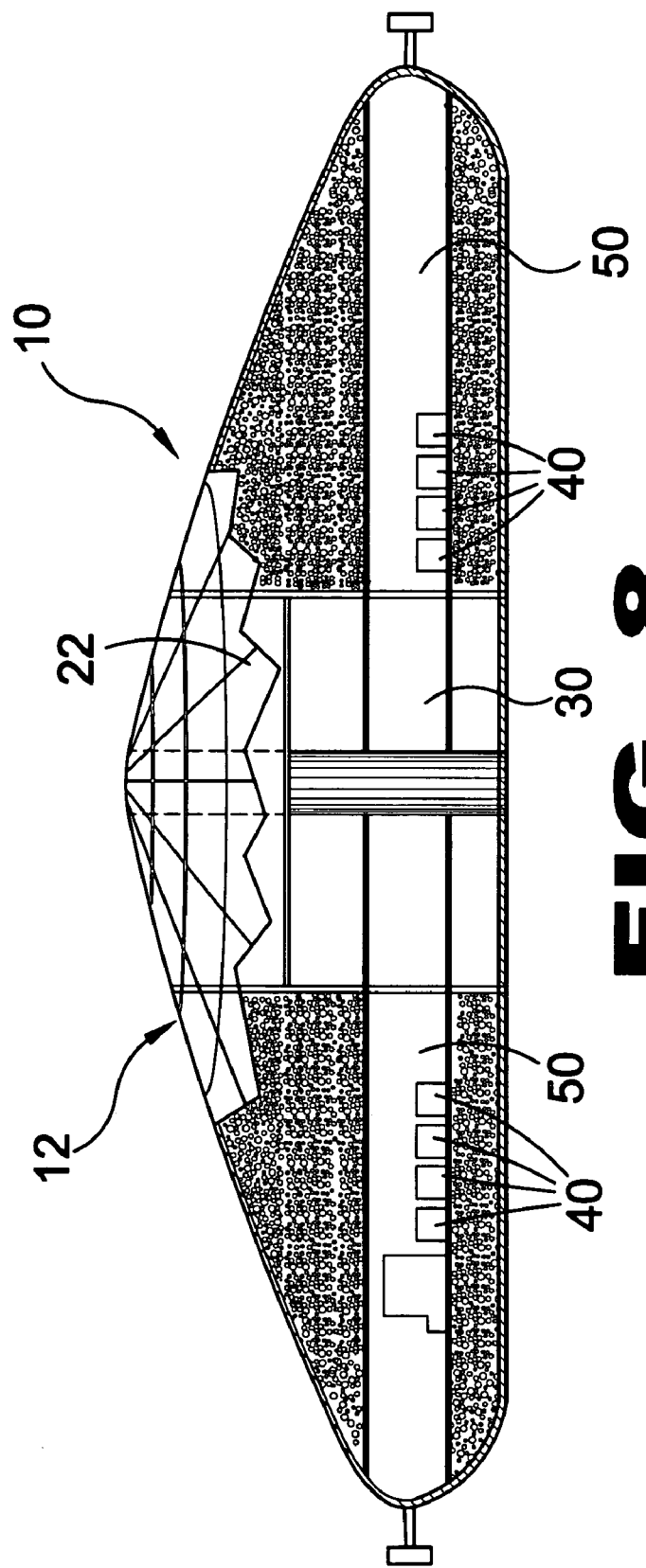

```
┌─────────────────────────────────────────────┐
│  MEETING OBJECTIVES FOR THE SPACECRAFT      │
│         OF THE PRESENT INVENTION            │
└─────────────────────────────────────────────┘
                      │
     ┌────────────────────────────────────────┐
     │  BY MEANS OF USING ADVANCED TECHNOLOGY │
     │ MATERIAL AND UNIQUE STRUCTURAL FORM FOR│
     │   THE SPACECRAFT OF THE PRESENT        │
     │              INVENTION                 │
     └────────────────────────────────────────┘
                      │
     ┌────────────────────────────────────────┐
     │      BY MEANS OF UTILIZING VARIOUS     │
     │  SOURCES OF ENERGY FOR THE SPACECRAFT  │
     │       OF THE PRESENT INVENTION         │
     └────────────────────────────────────────┘
                      │
     ┌────────────────────────────────────────┐
     │ BY MEANS OF MEETING AND EXCEEDING      │
     │   MARKET NEEDS OF THE INDUSTRY         │
     └────────────────────────────────────────┘
```

FIG. 10

CHARACTERISTICS OF ARAMID FIBERS (KEVLAR®), AN ADVANCED TECHNOLOGY MATERIAL FOR THE SPACECRAFT OF THE PRESENT INVENTION

- HIGH TENSILE STRENGTH AT LOW WEIGHT
- LOW ELONGATION TO BREAK HIGH MODULUS (STRUCTURAL RIGIDITY)
- LOW ELECTRICAL CONDUCTIVITY
- HIGH CHEMICAL RESISTANCE
- LOW THERMAL SHRINKAGE
- HIGH TOUGHNESS (WORK-TO-BREAK)
- EXCELLENT DIMENSIONAL STABILITY
- HIGH CUT RESISTANCE
- FLAME RESISTANT, SELF-EXTINGUISHING

FIG. 11

SOURCE: FUTRON CORP. - ASCENT STUDY

ASCENT STUDY GLOBAL MARKETS (ORBITAL)

| Class | Market Segment | Yr 2001 launches | ASCENT forecasts Yr 2010 | Yr 2020 |
|---|---|---|---|---|
| Commercial | Telephony | 2 | 1 | 2 |
| Commercial | Television & Radio | 5 | 8 | 8 |
| Commercial | Data Communications | 4 | 3 | 6 |
| Commercial | Remote Sensing (Commercial) | 2 | 3 | 4 |
| Commercial | On-orbit Sparing | 2 | 2 | 3 |
| Commercial | Public Space Travel | 0 | 0 | 10 |
| Commercial | Space Burial | 0 | 0 | 1 |
| Government | Positioning | 3 | 4 | 1 |
| Government | Civil Remote Sensing | 5 | 6 | 5 |
| Government | Military Remote Sensing | 6 | 8 | 5 |
| Government | Military Communications | 11 | 5 | 4 |
| Government | ISS Missions | 14 | 14 | 14 |
| Government | Space Weapons | 0 | 1 | 1 |
| Government | Human Space Exploration | 1 | 4 | 4 |
| Government | Space Science (Non- ISS ) | 5 | 8 | 2 |
| Government | Human Space Rescue | 0 | 0 | 0 |
| Government | Asteroid Detection & Negation | 0 | 1 | 0 |
| Government | Other Government Missions | 1 | 2 | 1 |
| Total | | 61 | 70 | 74 |

SOURCE: FUTRON CORP. - ASCENT STUDY

FIG. 17

VERY LONG TERM MARKETS OF ASCENT STUDY

| Classification | Market Segment | Notes |
|---|---|---|
| Evolving Commercial (next 20 years) | Commercial ISS Module | These four markets did not generate any dedicated launches during the next 20 years at current price levels. |
| | Space Hardware R&D | |
| | Orbital Servicing & Salvage | |
| | Propellant Depot | |
| Emerging Government and Commercial (beyond 2020) | Space Traffic Control | |
| | Law Enforcement | |
| | Asteroid & Lunar Mining | |
| | Space Solar Power-on orbit | |
| | Space Solar Power-to Earth | |
| | On-orbit Construction | |
| | Space Crystal Manufacturing | full manufacturing, not R&D, is implied. |
| | Vacuum Processing | full manufacturing, not R&D, is implied. |
| | Space Hotels | a few launches possible near to 2020 |
| | Space Settlements | |
| | Orbiting Advertisements | |
| | Hazardous Waste Disposal | |
| | Space Debris Management | |
| | On-orbit Education | |
| | Space Hospitals | |
| | Space Athletic Events | |
| | Artificial Space Phenomena | |
| | Space Theme Park | |
| | Space Product Promotion | |
| | Space Agriculture | |

SOURCE: FUTRON CORP. - ASCENT STUDY

FIG. 18

HYDROGEN-FUELED SPACECRAFT

BACKGROUND OF THE INVENTION

1. Field of the Invention

The present invention relates generally to aircraft and, more specifically, to a spacecraft having facilities for carrying astronauts and payloads into the earth satellite orbit and space having a composite fiber body with a Kevlar exterior skin. Said craft having a substantially round shape with a portion covered with solar cells. Said solar cells powering electrical motors and a plurality of rockets using a quantity of hydrogen fuel.

2. Description of the Prior Art

There are other devices designed for displaying variables. Typical of these is U.S. Pat. No. 4,394,529 issued to Gounder et al on Jul. 19, 1983.

Another patent was issued to Kosmo et al. on May 8, 1990 as U.S. Pat. No. 4,923,741. Yet another U.S. Pat. No. 5,890,676 was issued to Coleman et al on Apr. 6, 1999 and still yet another was issued on Aug. 27, 2002 to Taylor as U.S. Pat. No. 6,439,508.

Another patent was issued to Hamilton on Mar. 23, 2004 as U.S. Pat. No. 6,708,922. Yet another U.S. Pat. No. 6,739,555 was issued to Mazanek et al. on May 25, 2004. Another was issued to Jozef on Oct. 1, 1993 as French Patent No. FR2689091 and still yet another was issued on Nov. 10, 1994 to S-tinnesbeck as German Patent No. DE 4422197.

Another patent was issued to Ishkov on Dec. 7, 1995 as International Patent Application No. WO95/32896. Yet another Russian Patent Tarasov on Nov. 27, 2002 as Russian Patent No. RU2193510 and still yet another was issued on Dec. 20, 2002 to Milovanov et al as Russian Patent No. Ru2194653.

U.S. Pat. No. 4,394,529

Inventor: Raj N. Gounder

Issued: Jul. 19, 1983

A panel comprising an aluminum honeycomb core and outer face skins of Kevlar, a bi-directional epoxy-reinforced polyparabenzamide fabric which is a thermal and electrical insulator adhering to the core and forming the opposite flat surfaces of the panel. Solar cells are glued directly to one face skin while a set of epoxy-reinforced carbon fiber stiffeners are glued to the other face skin. The composite structure has a coefficient of thermal expansion closely matching that of the solar cells providing a very lightweight and stiff structure.

U.S. Pat. No. 4,923,741

Inventor: Joseph J. Kosmo et al.

Issued: May 8, 1990

A flexible multi-layered covering article 10 for protection against the hazards of exposure to the environment of outer space. The covering 10 includes an outer layer section 12 comprising an outermost lamina 14 of woven expanded tetrafluoroethylene yarns (Gore-Tex) for protecting against abrasion and tearing, an underlying weave 16 of meta-aramid yarns (Nomex) and para-aramid yarns (Kevlar) for particle impart protection, an electrostatic charge dissipation and control system 18 incorporated therein, and a chemical contaminants control barrier applied as a coating 19. A middle section includes a succession of thermal insulating layers 21 of polymeric thermoplastic or thermoforming material, each of which is coated with a metal deposit of high infra-red emissivity and low solar radiation absorption characteristics and separated from adjacent insulating layers 21 by a low thermal conductance material 26. The covering 10 further includes a radiation attenuating layer 28 of a tungsten-loaded polymeric elastomer binder for protecting against "bremsstrahlung" radiation and an inner layer 32 of "rip-stop" polyester material for abrasion protection. A chloroprene coating may be supplied the polyester-material for added micrometeroid protection. Securing means 36 of low heat conductance material secures the multi-layers together as a laminar composite.

U.S. Pat. No. 5,890,676

Inventor: Richard Coleman

Issued: Apr. 6, 1999

A neutral buoyancy fuel bladder uses hydrogen and oxygen to power an airship. The neutral buoyancy fuel bladder includes a fuel cell, electrolyzer, and means for storing hydrogen, oxygen and water. The fuel cell uses the hydrogen and oxygen to create heat, water and current flow. An energy source transmits a beam to an energy receiving unit on the airship, and the energy from said beam is used to (1) power said airship, and (2) replenish the supply of hydrogen and oxygen.

U.S. Pat. No. 6,439,508

Inventor: Thomas C. Taylor

Issued: Aug. 27, 2002

An improved inflatable habitation volume in space comprising reduced cost, improved debris impact protection, enhanced penetration resistance, self sealing qualities, innovative flat end caps, industry accepted commercial design/manufacturing techniques, enhanced inflatable assembly techniques and expanded interior volume. Costs are reduced by compressing the launch package, removing the three gravity launch load requirements from the transportation process and inflating in microgravity. The inflatable habitation volume unit can be connected to either existing orbital facilities or connected to similar units to create expanded volumes and space tourist torus structures rotated for partial gravity.

U.S. Pat. No. 6,705,922

Inventor: Jonathan Hamilton

Issued: Mar. 23, 2004

A modular unit 129 for forming an airship 100 includes an elongate spine 106 intended to extend along a longitudinal axis of the airship 100. The spine 106 includes a number of interconnecting elements 108 each of which has connection means 182 for being joined in end to end relationship with an interconnecting element 108 of an adjacent modular unit 129. Buoyant support means in the form of gas bags 105 are fixed relative to the spine and are positioned within annular spaces 132 and 134. The invention also extends to an airship 100 which may be formed from a number of modular units 129 connected end to end and with a central spine 106 extending between outer extremities 116 and 118. A gondola 101 is located within a lower half of annular space 102 such that an outwardly facing surface is flush with an outer surface of the airship 100.

U.S. Pat. No. 6,739,555

Inventor: Daniel D. Mazanek et al.

Issued: May 25, 2004

A space module has an outer structure designed for traveling in space, a docking mechanism for facilitating a docking operation therewith in space, a first storage system storing a first propellant that burns as a result of a chemical reaction therein, a second storage system storing a second propellant that burns as a result of electrical energy being added thereto, and a bi-directional transfer interface coupled to each of the first and second storage systems to transfer the first and second propellants into and out thereof. The space module can be part of a propellant supply architecture that includes at least two of the space modules placed in an orbit in space.

French Patent Number FR2689091

Inventor: Jozef Rits Willy

Issued: Oct. 1, 1993

The self-supporting vaulted and collapsible panel, for use e.g. in space as a reflector, comprises a thin supple membrane (2) and a series of ribs (3) to tension it. The ribs are made from thin slats with two main surfaces, one of which faces towards the membrane, and the membrane has guides for the slats. At least one end of each guide has a pocket to receive a slat so that in its deployed state the ends of the slats exert an axial force on the membrane and tension it, while in the collapsed state the membrane occupies only a small volume for stowing inside an orbital launcher.

The slats are designed to follow the curvature of the deployed membrane and themselves have a curved cross-section; they can be made from a very elastic metal alloy, e.g. of beryllium and copper. The membrane is made from a plastic such as Kapton (RTM), reinforced with fibres, preferably of Kevlar (RTM), and it can be metallised to reflect electromagnetic waves, especially infra-red, visible light, U-V light and/or microwaves.

ADVANTAGE—Large dimensions with great stability and precision.

German Patent Number DE4422197

Inventor: Thomas Stinnesbeck

Issued: Nov. 10, 1994

The use of solar energy for supplying electrical drives of space vehicles has already been considered for a long time. High thrust phases, high terminal velocities and virtually any desired orbits can be designed if the electricity for supplying the electrical motors in high-power systems (turbines, generators etc) is produced by the combustion of hydrogen and oxygen. In contrast to a conventional H2/O2 rocket motor, the reaction product of water is, however, not ejected but is converted back into hydrogen and oxygen again, in the sense of a circuit, utilising solar energy, as a result of which the system is "charged" again. By arranging the energy gathering and acceleration phases one behind the other, any desired orbits and high terminal velocities can thus be achieved. In principle, in order to calculate specific orbits, the separation of energy collection points (so-called tanking systems) and reciprocating-operation space ships is also recommended, which reciprocating-operation space ships exchange water for "fresh" hydrogen and oxygen at the refuelling point at the end of a flight phase in order to be able to fly onwards immediately.

International Patent Application Number WO95/32896

Inventor: Ishov Jury Grigorievich

Issued: Dec. 7, 1995

The proposed aerospace transport system comprises a reusable aerospace vehicle (1) provided with a rocket propulsion system and landing engines and several take-off boosters (2) in the form of aerodynamic aircraft capable of flying and landing independently. According to the invention, the reusable aerospace vehicle (1) is discus-shaped with a relative thickness of between 0.10 and 0.45. The heavy-duty framework of the reusable aerospace vehicle is formed by a rigid heavy-duty torus (3) which forms the edge of the hull, and by a rigid heavy-duty payload capsule (5) which is attached to the torus by an inner suspension element (4). The rigid heavy-duty torus (3) has an eccentricity of between 0.025 and 0.050. The hull of the reusable aerospace vehicle (1) has a soft gas-impermeable outer skin in two skin sections, namely, an upper skin section (6) and a lower skin section (7). The upper skin section (6) is attached at its edge to the heavy-duty torus (3). The lower skin section (7) is attached at its major edge to the heavy-duty torus (3) and at its minor edge to the payload capsule (5). Within the outer skin are balloons (8) which are attached to the heavy-duty torus (3) and to the payload capsule (5) and filled with lighter-than-air gas (hydrogen). The balloons (8) are provided with devices for feeding hydrogen to the propulsion system engines and for refilling with lighter-than-air gas. The propulsion system engines of the reusable aerospace vehicle (1) are mounted on the heavy-duty torus (3) preferably at the rear section of the hull.

Russian Patent Number RU2165870

Inventor: N. F. Ivanov

Issued: Apr. 27, 2001

FIELD: rocketry and space engineering; single-stage facilities for injection of payloads into Earth satellite orbit. SUBSTANCE: system includes payload bay and launch vehicle arranged in tandem. Launch vehicle is provided with liquid-propellant engine plant with central body and modular combustion chambers which are secured on the outside of bearer frame inside fairings which are mounted at spaced relation to central body. Gaseous hydrogen rings heated to high temperature are admitted to active leg into external atmosphere from combustion chambers (from screen of their internal cooling). Excessive hydrogen is burnt finally in incoming flow of air where fairing with chambers are introduced. EFFECT: increased specific impulse of lox/ liquid hydrogen engines; increased mass of payload.

Russian Patent Number RU2193510

Inventor: A. T. Tarasov et al.

Issued: Nov. 27, 2002

FIELD: alcoholic beverage industry. SUBSTANCE: after filling the bottle and before its sealing gaseous aromatizer is fed into space over surface of poured in vodka. Said air space can be previously filled with inert gas or mixture of inert gas and gaseous aromatizer before filling aromatizer. Preference is made to aromatizers with phytoscents, such as coniferous, peppermint or bird cherry scents. Container is provided with information on scent of aromatizer. EFFECT: prevention of counterfeiting, facilitated identification of producer owing to marking of products with pleasant scent.

Russian Patent Number RU2194653

Inventor: A. G. Milovanov et al.

Issued: Dec. 20, 2002

FIELD: recoverable space transport facilities for delivery of payloads and passengers from orbit to orbit. SUBSTANCE: proposed orbital aircraft has engine plant, wings, tail unit and payload section, landing gear and control units. Aircraft has two cylindrical oxygen tanks fastened together by their lateral surfaces. Tanks are located in one horizontal plane. Hydrogen tank is coupled to butts of oxygen tanks over its diameter which exceeds diameters of oxygen tanks at upward shift. At joint area projection is formed; payload section is located at the top on lateral surfaces of oxygen tanks. Wings are mounted on lateral surface of tanks with engine plant mounted on their rear butts in tail section. Tail unit has two fins; each fin is located in tail section. EFFECT: improved aerodynamic and CG position characteristics; enhanced operational reliability; minimization of structural members.

While these aircraft devices may be suitable for the purposes for which they were designed, they would not be as suitable for the purposes of the present invention, as hereinafter described.

SUMMARY OF THE PRESENT INVENTION

A primary object of the present invention is to provide an aircraft for space travel.

Another object of the present invention is to provide a spacecraft having a composite fiber body with a Kevlar exterior skin.

Yet another object of the present invention is to provide a spacecraft having a substantially round shape with a portion covered with solar cells.

Still yet another object of the present invention is to provide a spacecraft wherein said solar cells power electrical motors and a plurality of rockets using a quantity of hydrogen fuel.

Additional objects of the present invention will appear as the description proceeds.

The present invention overcomes the shortcomings of the prior art by providing a space craft having facilities for carrying astronauts and payloads into the earth satellite orbit and space having a composite fiber body with a Kevlar exterior skin. Said craft having a substantially round shape with a portion covered with solar cells. Said solar cells powering electrical motors and a plurality of rockets using a quantity of hydrogen fuel.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 7 is a block diagram of the spacecraft's physical specifications;

FIG. 8 is a sectional view of the present invention;

FIG. 10 is a block diagram of the spacecraft of the present inventions' objectives;

FIG. 11 is a block diagram of the characteristics of spacecraft's outer skin material Kevlar7 aramid fibers;

FIG. 17 is a chart of the ascent study global markets (orbital); and

FIG. 18 is a chart of the ascent study very long term markets.

DESCRIPTION OF THE REFERENCED NUMERALS

Figure 1:
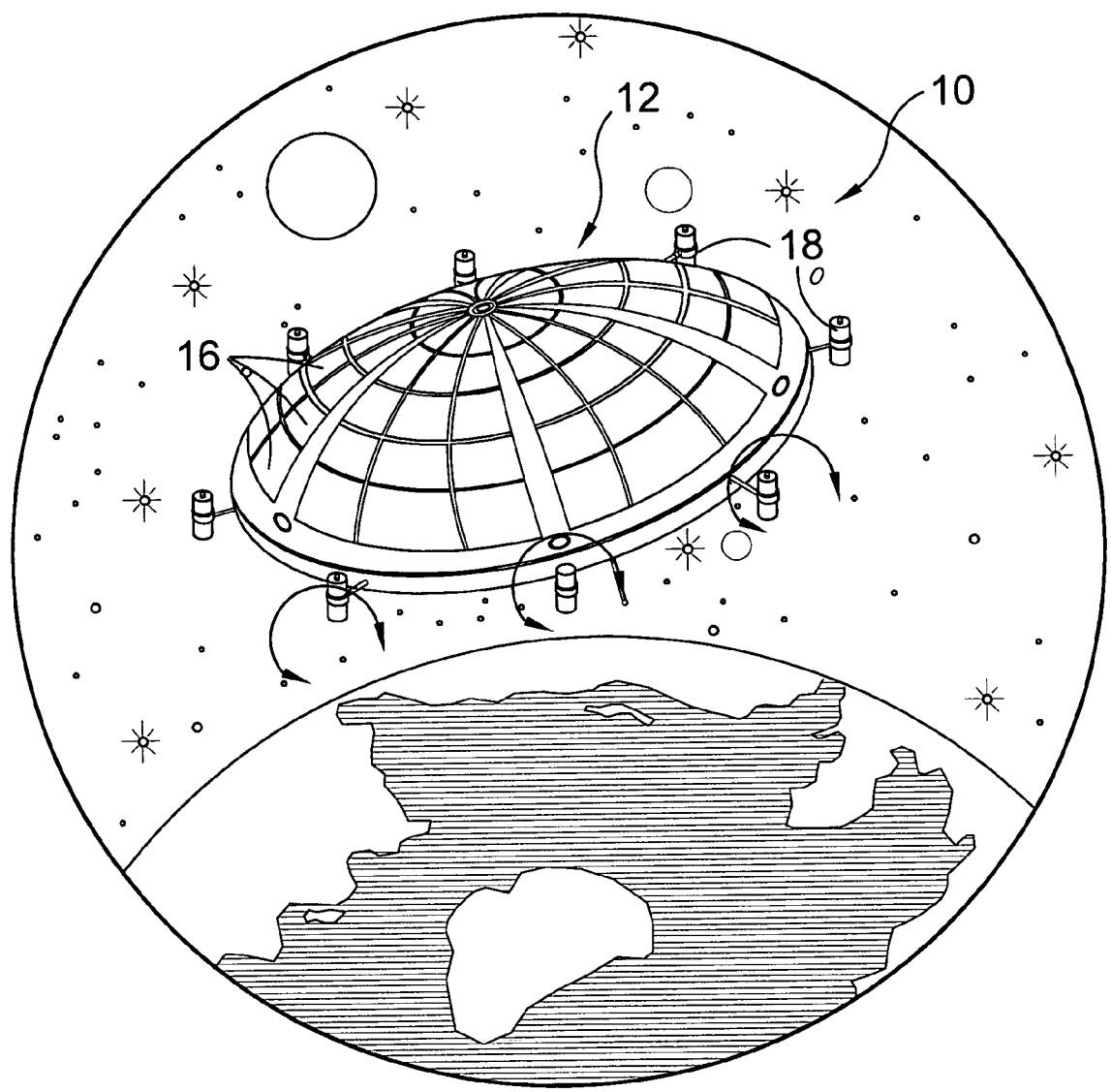
FIG. 1 is an illustrative view of the present invention in use.

Turning now descriptively to the drawings, in which similar reference characters denote similar elements throughout the several view, the figures illustrate the Hydrogen Fueled Spacecraft of the present invention. With regard to the reference numerals used, the following numbering is used throughout the various drawing figures.

10 Hydrogen Fueled Spacecraft of the present invention
12 spacecraft
14 composite fiber body
16 solar cells
18 rocket thrusters
20 cargo loading ramp
22 Kevlar exterior skin
24 rotating cylinder
26 hydrogen gas
28 living quarters
29 cargo area
30 first level of 24
32 second level of 24
34 third level of 24
36 fourth level of 24
38 fuel cells
40 electric motor
42 hydrogen gas bags
44 oxygen gas bags
46 water vapor cell bags
48 external camera
50 corridor
52 window

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is a spacecraft 12 having facilities for carrying astronauts and payloads into the earth satellite orbit and space having a composite fiber body with a Kevlar exterior skin. Said craft having a substantially round shape with a portion covered with solar cells 16. Said solar cells 16 powering electrical motors and a plurality of rotatable rocket thrusters 18 using a quantity of hydrogen fuel.

Figure 2:
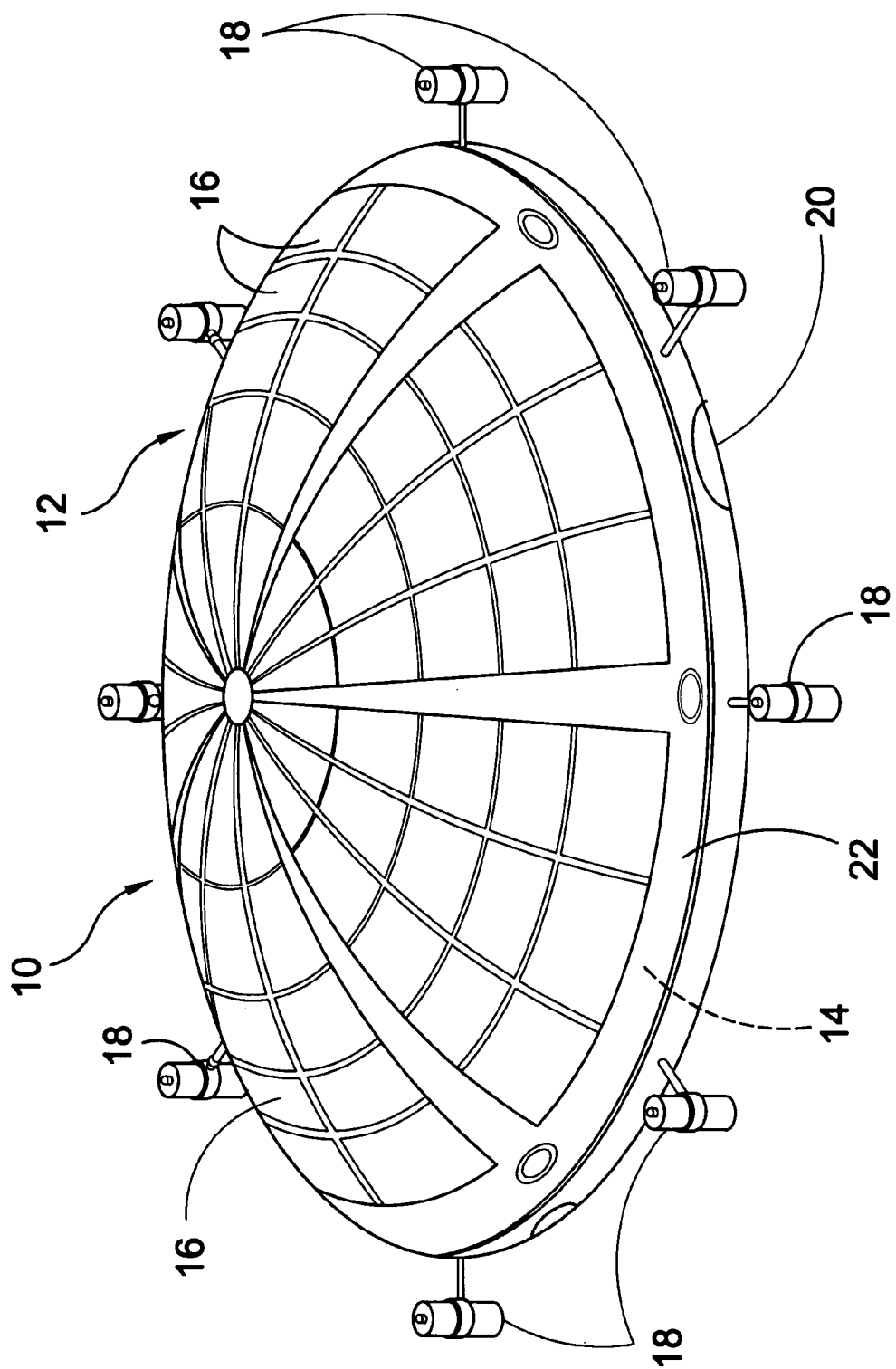
FIG. 2 is a perspective view of the present invention.

FIG. 2 is a perspective view of the present invention 10. Shown is a perspective view of the present invention 10, a spacecraft 12 having a composite fiber body 14 with a Kevlar exterior skin 22. Eight thruster rockets 18 are evenly spaced around the periphery of the spacecraft to provide lift-off, landing and propulsion. Four cargo-loading ramps 20 are disposed peripherally and are at 45 degree angles to connect the bridge, engineering, living quarters and the food galley. Solar panels 16 cover 90 percent of the top of the spacecraft 12.

Figure 3:
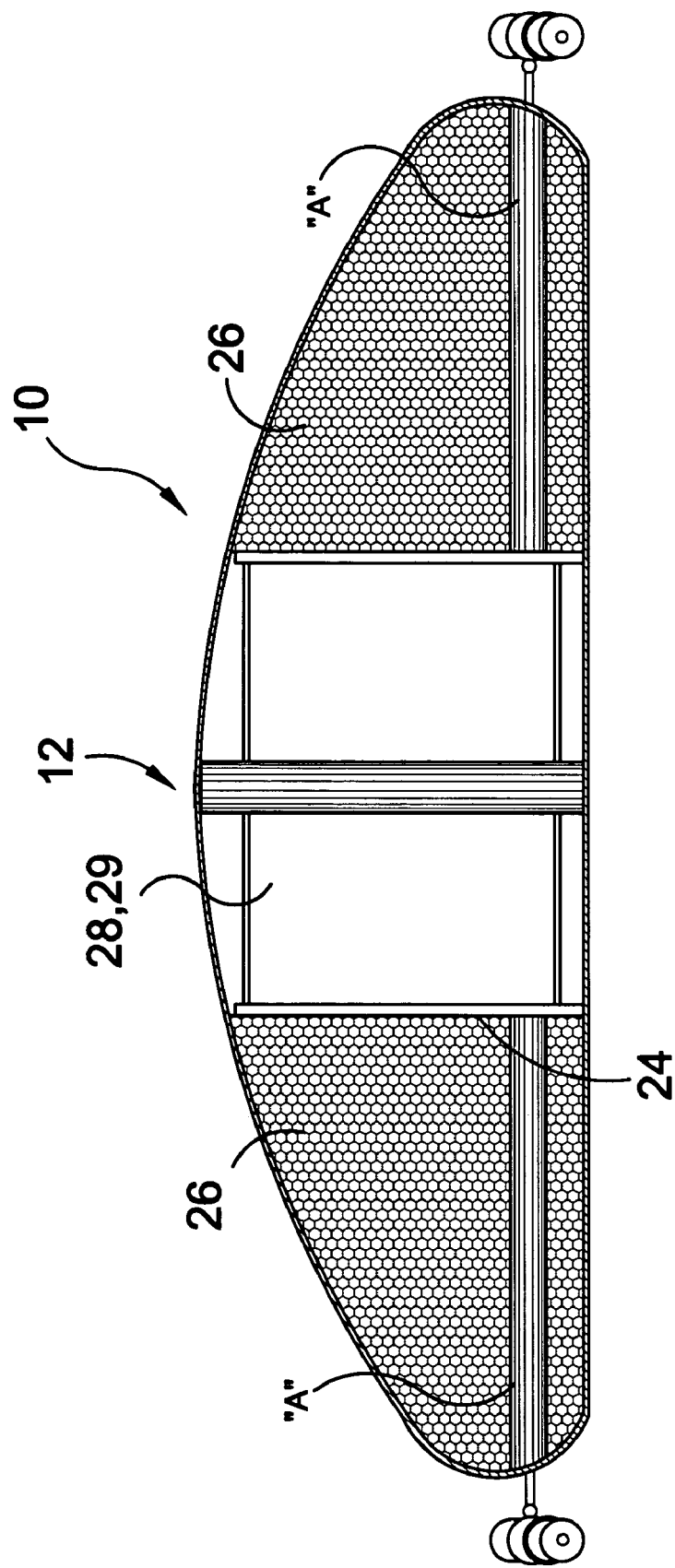
FIG. 3 is a sectional view of the present invention.

FIG. 3 is a sectional view of the present invention 10, a spacecraft 12 that operates primarily on hydrogen gas 26. A rotating cylinder 24 houses the living quarters, workspace and cargo areas and spins at a rate that provides 1 G of force to simulate Earth's gravity enabling the astronauts avoid weightlessness. This will help them avoid the problems with bone density and muscle atrophy that is now common in space travel.

Figure 4:
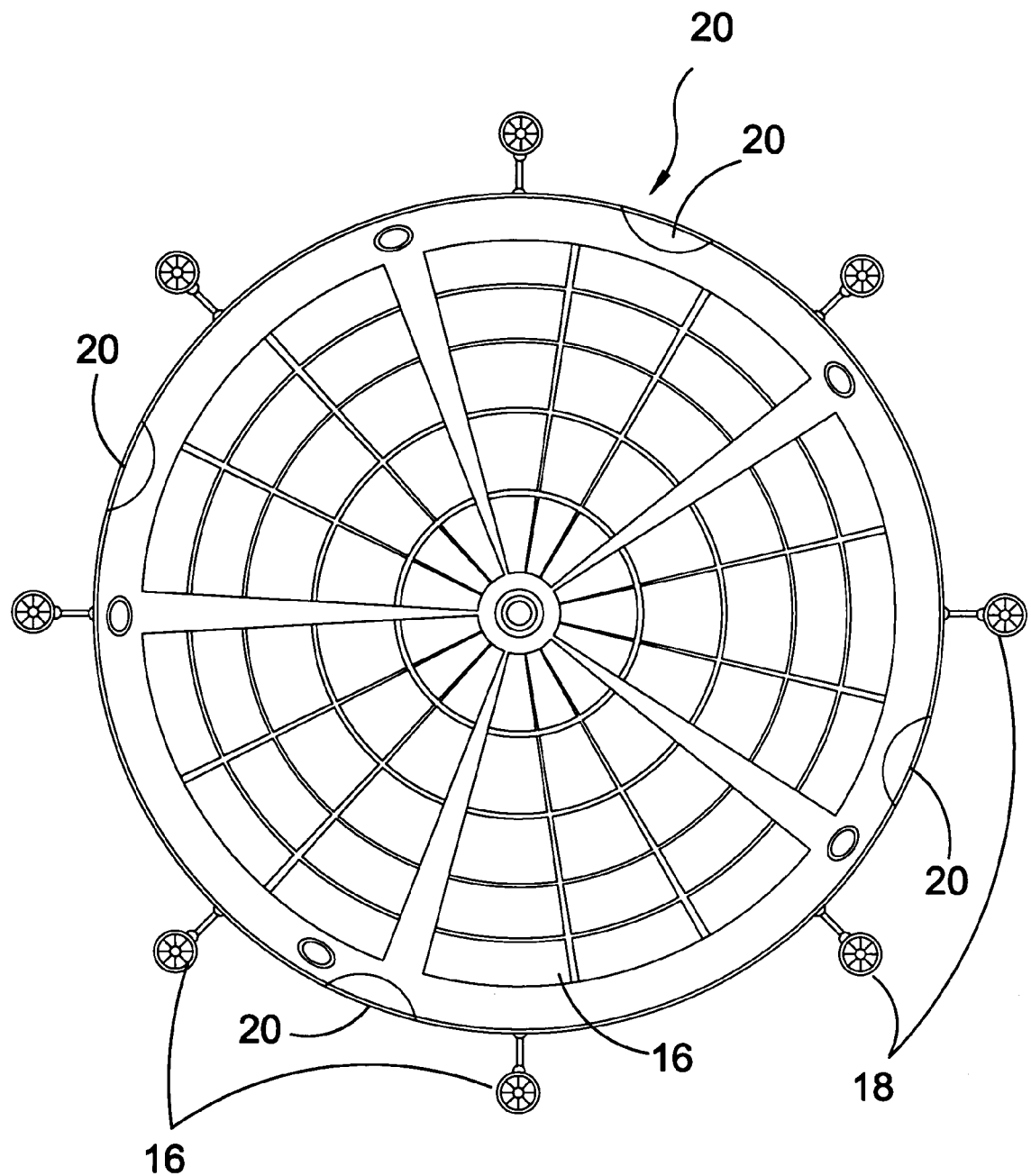
FIG. 4 is a top view of the present invention.

FIG. 4 is a top view of the present invention 10 wherein the top portion thereof is substantially covered with a plurality of solar panels 16. The rocket thrusters 18 include electrical jet engines and are selectively rotatable to provide lift and maneuverability. The four cargo-loading ramps 20 are also shown.

Figure 5:
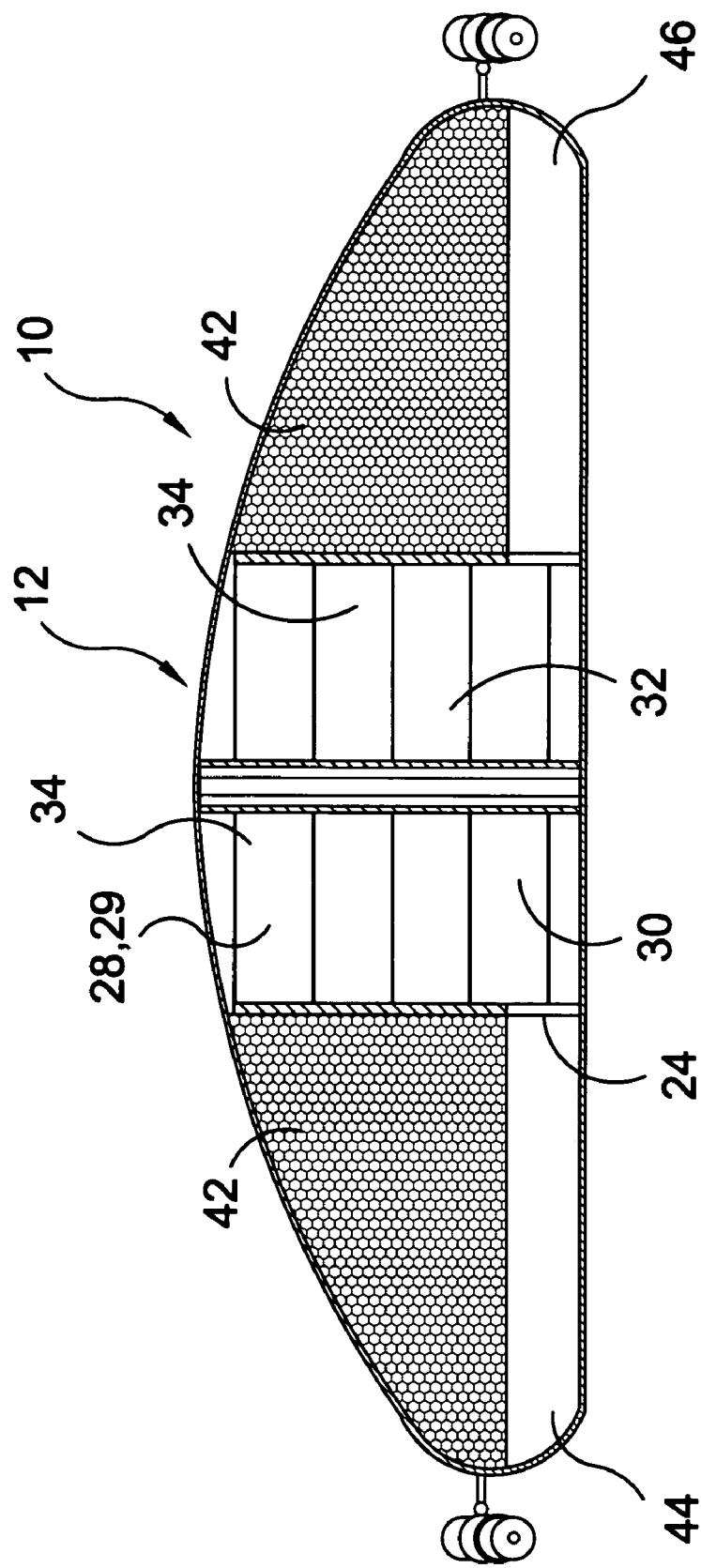
FIG. 5 is a sectional view of the present invention.

FIG. 5 is a perspective view of the present invention 10. Shown is a perspective view of the present invention 10, a spacecraft 12 having facilities for carrying astronauts and payloads into the earth satellite orbit and space. The present invention 10 includes a rotating cylinder 24 that will create 1G of force to simulate the Earths gravity. When the cylinder 24 begins its rotation, the astronauts have to be seated at the bottom of the spacecraft 12 because they will be living stuck to the walls and all tools equipment and other such objects must be screwed to the walls. The cylinder 24 has a first level 30, a second level 32, a third level 34 and a fourth level 36. A plurality of hydrogen gas bags 42 will be disposed in the upper portion of the spacecraft 12 outside the cylinder 24 and oxygen cell bags 44 and water vapor cell bags 46 will be located in a lower portion of the spacecraft 12 outside the cylinder 24. The living quarters 28 and cargo area 29 can be located on the fourth level 36.

Figure 6:
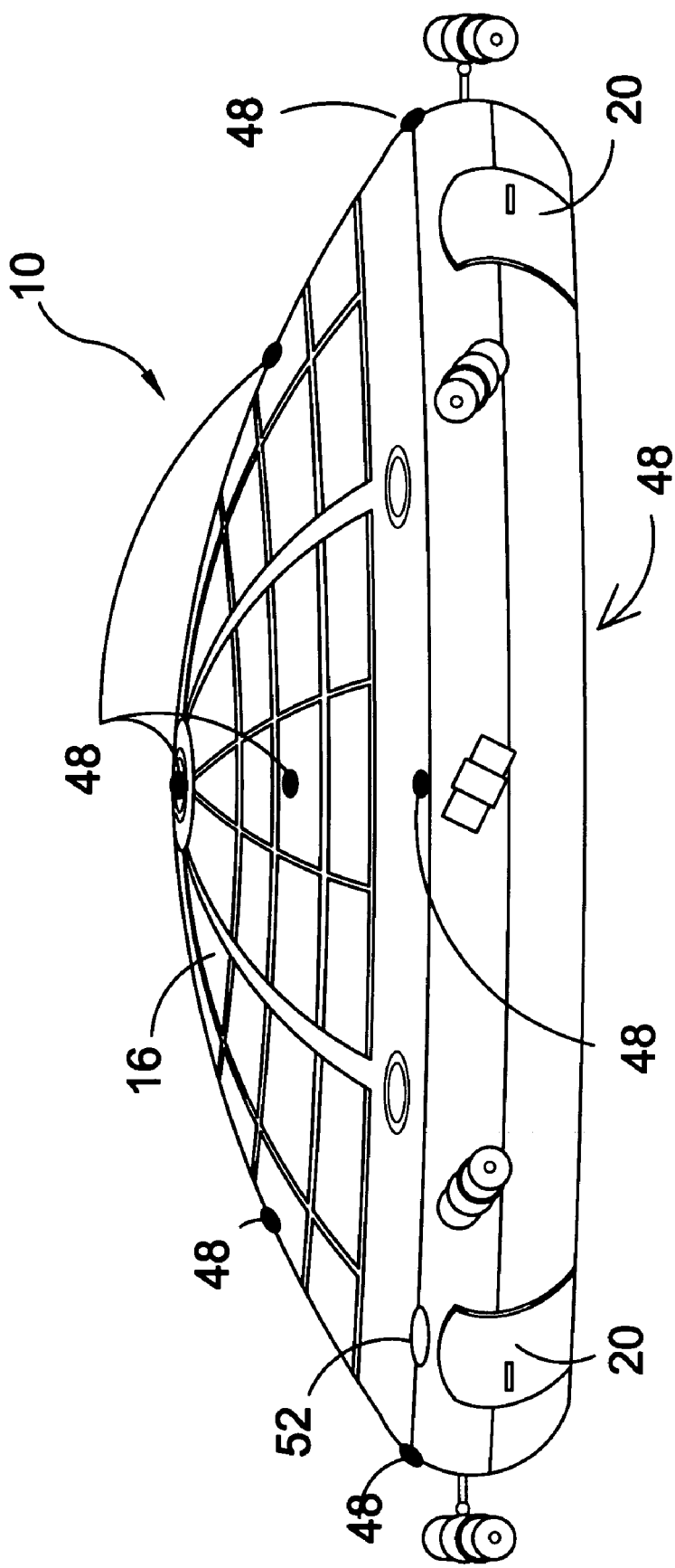
FIG. 6 is a side view of the present invention.

FIG. 6 is a side view of the present invention 10, showing the various external cameras 48, solar panels 16, windows 52 and cargo ramps 20. The cargo ramps 20 are hydraulically driven and are preferably 15 feet tall by 20 feet wide and fabricated of a sturdy yet lightweight material.

FIG. 7 is a block diagram of the present inventions physical specifications. Shown are the preferred dimensions of the present invention having a diameter of 200 feet, a height of 70 feet, a gas volume of 1,242,629 cubic feet, 8 electric jet engines, 8 rocket thrusters, a maximum speed of 100 MPH in the atmosphere, a maximum speed of 6,000 MPH in space, a lifting gas of hydrogen, gas bags containing highly pressurized water vapor, gas bags filled with purified air with pure oxygen, gas bags containing oxygen gas and having a payload of 66,000 pounds.

FIG. 8 is a sectional view of the present invention 10. There are eight electric motors 40 located in the corridors 50 which extend from the cargo ramps 20 to bridge engineering on the first level 30. The spacecraft 12 has a composite fiber body 14 with a Kevlar exterior skin 22. Spaceloft material may be used as an undercoating for the Kevlar skin 22 since it is lightweight, has very low thermal conductivity, is easy to apply and handle, and is flexible and non-toxic. Spaceloft can also be used to coat the gas bags.

Figure 9:
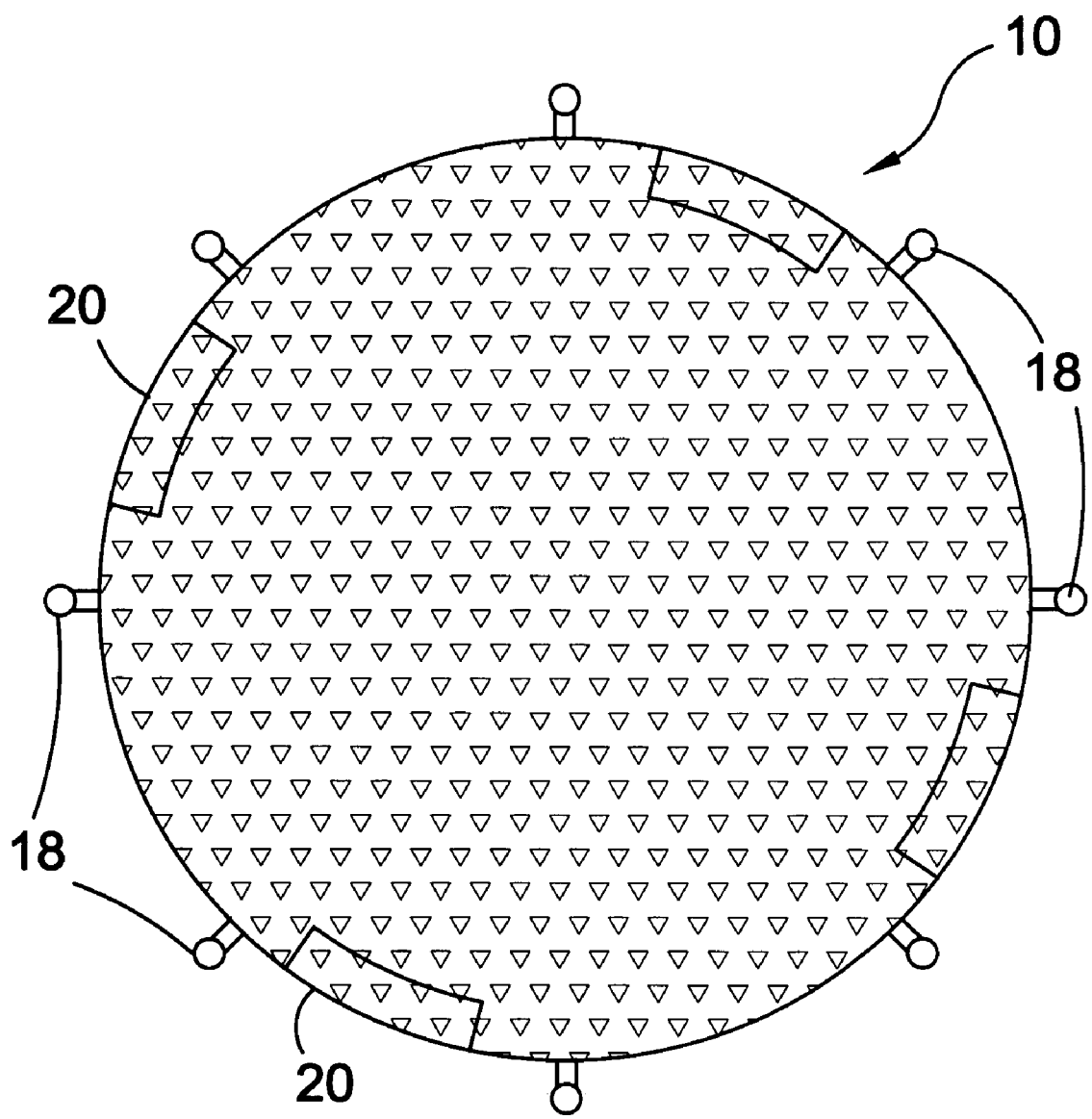
FIG. 9 is a bottom view of the present invention. Shown is a bottom view of the present invention.

FIG. 9 is a bottom view of the present invention 10 demonstrating the spatial relationships of the rocket thrusters 18 and the cargo ramps 20.

FIG. 10 is a block diagram of the spacecraft of the present inventions' objectives. The spacecraft of the present invention meets the needs of the industry by utilizing advanced technology materials and power systems that allow for transport of large capacity payloads at improved cost.

FIG. 11 is a block diagram of the characteristics of spacecraft's outer skin material Kevlar7 aramid fibers. The spacecraft of the present invention utilizes Kevlar7 aramid fibers. Kevlar7 is the commercial name for poly (p-phenylene terephtalamide). This fiber is an organic fiber in the aromatic polyamide (aramid) family. The chemical structure of aramids distinguishes them from other commercial manmade and natural fibers and gives Kevlar7 its unique properties. It has high strength, stiffness, toughness and thermal stability. In addition to these characteristics, Kevlar7 is proven to be 5 times stronger than steel on an equal weight basis. Furthermore, Spaceloft material may be used as an undercoating of the Kevlar7 to enhance the aforementioned characteristics.

Figure 12:
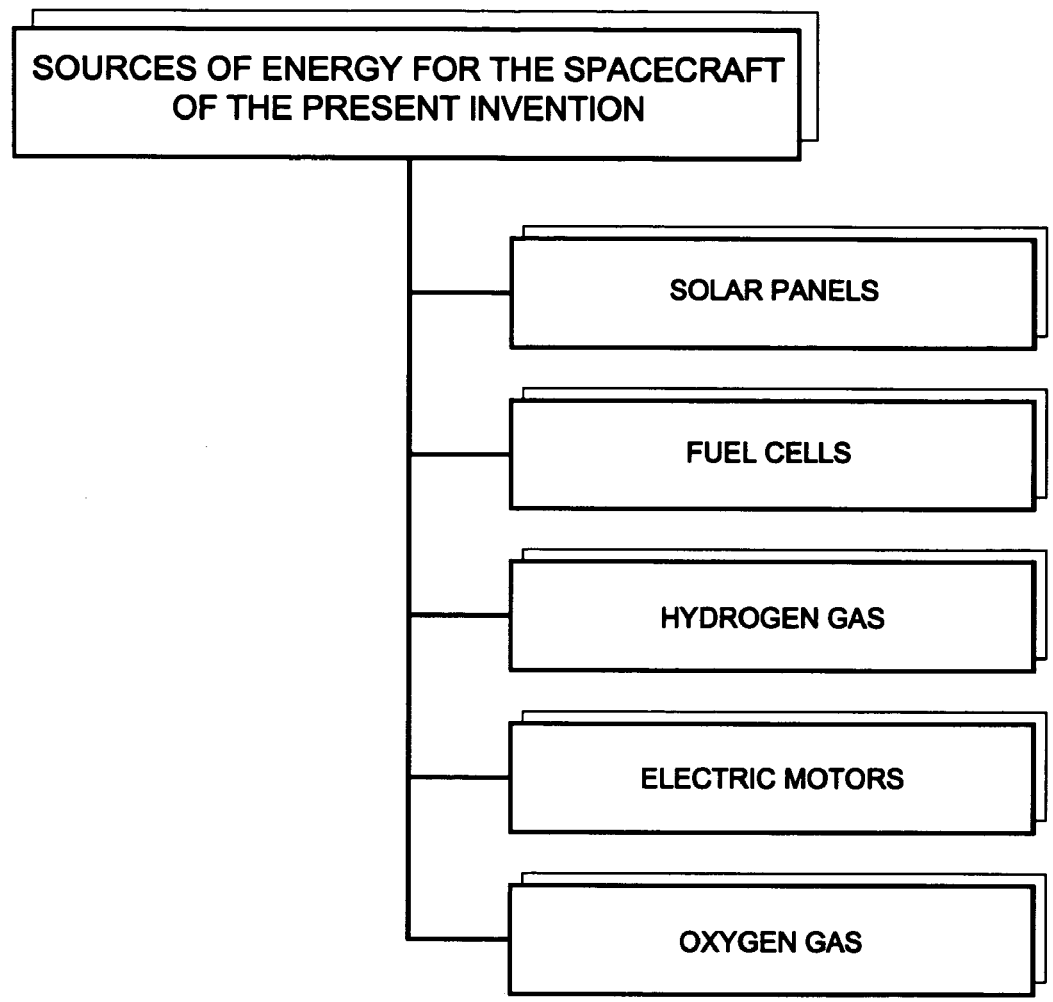
FIG. 12 is a block diagram of the spacecraft's sources of energy of the present invention.

FIG. 12 is a block diagram of the spacecraft's sources of energy of the present invention. The spacecraft of the present invention utilizes a plurality of power sources to achieve launching, orbiting and landing needs. Each of these sources of energy may be used independently or in conjunction with each other to maximize efficiency.

Figure 13:
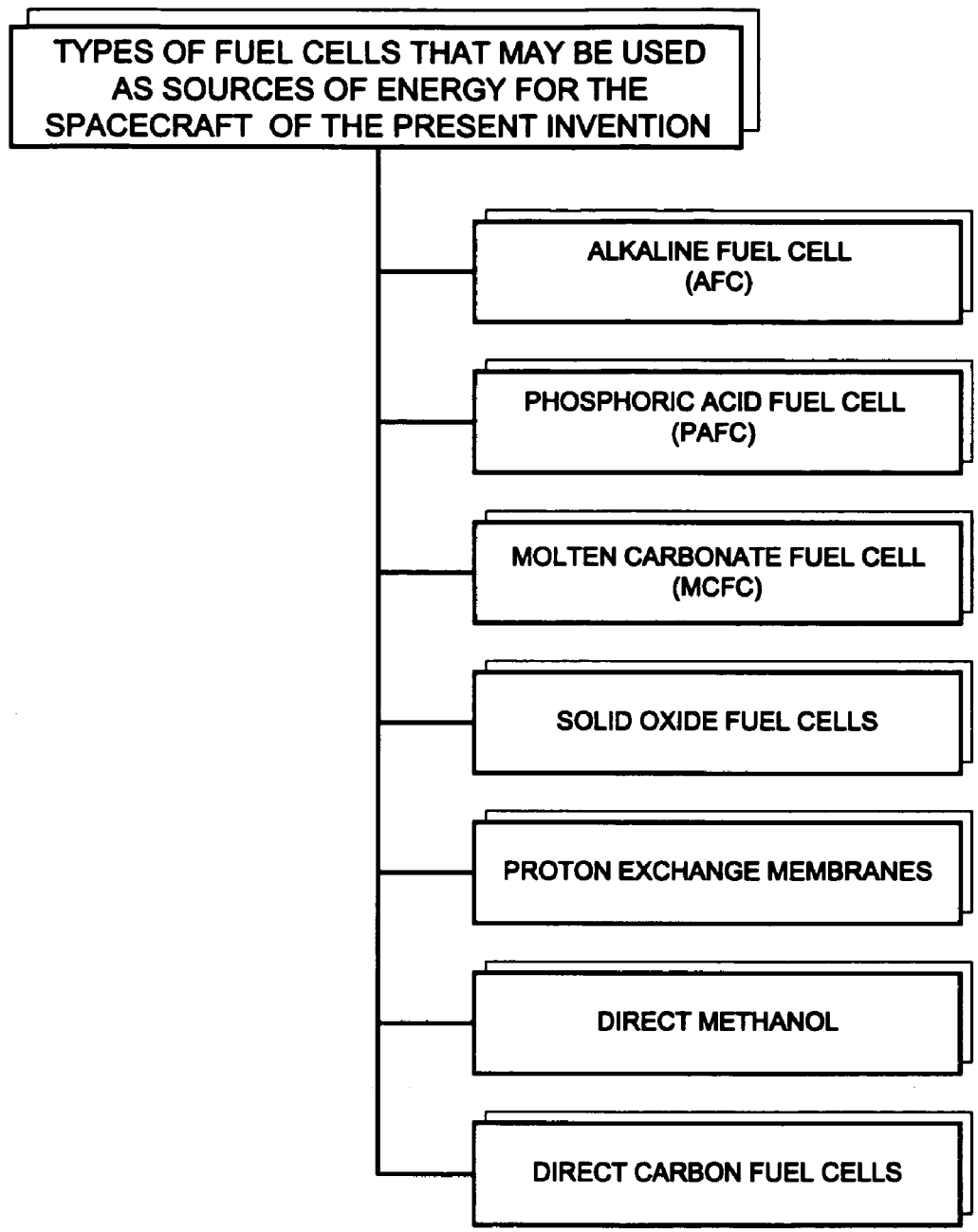
FIG. 13 is a block diagram of the spacecraft's fuel cell sources of energy of the present invention.

FIG. 13 is a block diagram of the spacecraft's fuel cell sources of energy of the present invention. The alkaline fuel cell produces both electricity and portable water making it a logical choice for spacecraft and has been used effectively by the NASA program. To provide means for improved efficiency, the present invention may utilize any number for fuel cell types. Each of these sources of energy may be used independently or in conjunction with each other to maximize efficiency.

Figure 14:
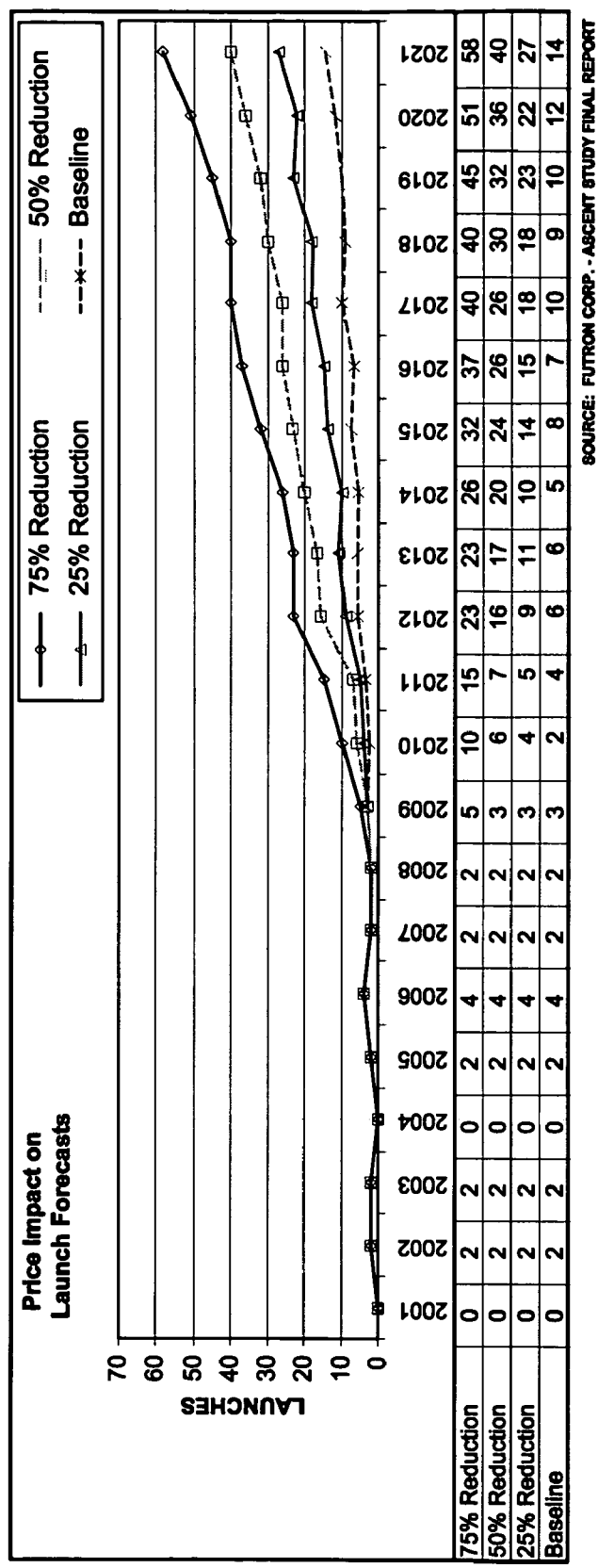
FIG. 14 is a graph of price impact on launch forecasts.

FIG. 14 is a graph of price impact on launch forecasts. The graph depicts a considerable impact on the launch rates due to cost. The present invention provides means and supports the reduction in costs by utilizing multiple energy sources for high efficiency and aramid fibers material for reduced weight. The present invention provides a spacecraft with high technology yet simplistic design.

Figure 15:
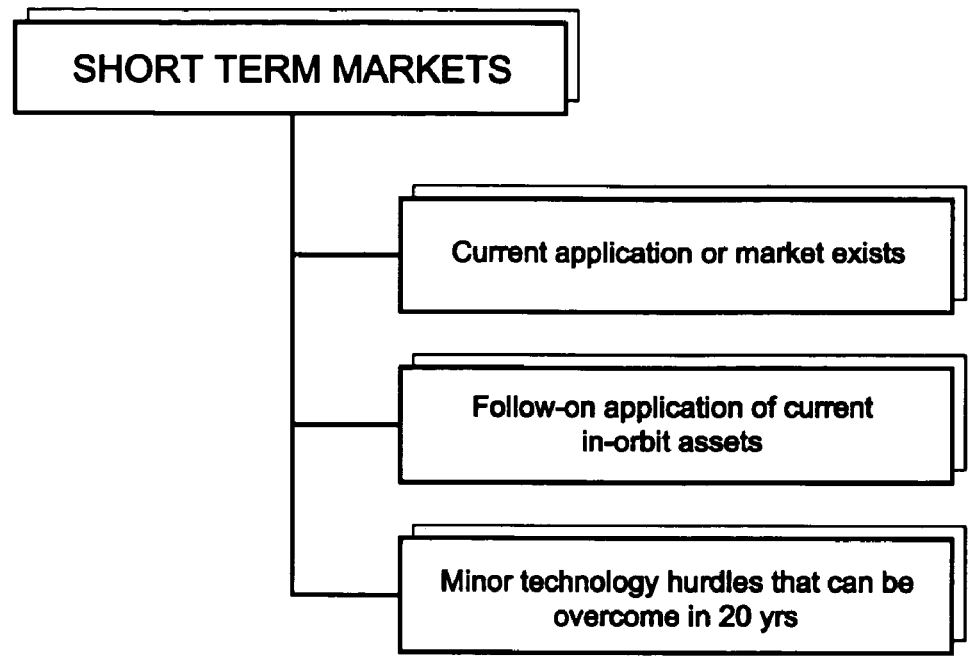
FIG. 15 is a chart of the ascent study short term markets.

FIG. 15 is a chart of the ascent study short-term markets. Depicted in FIG. 15 is a block diagram of short-term markets, as described in the ascent study. An objective of the spacecraft of the present invention is to provide means for increased capacity and improved affordability in space transport of payload to support these needs.

Figure 16:
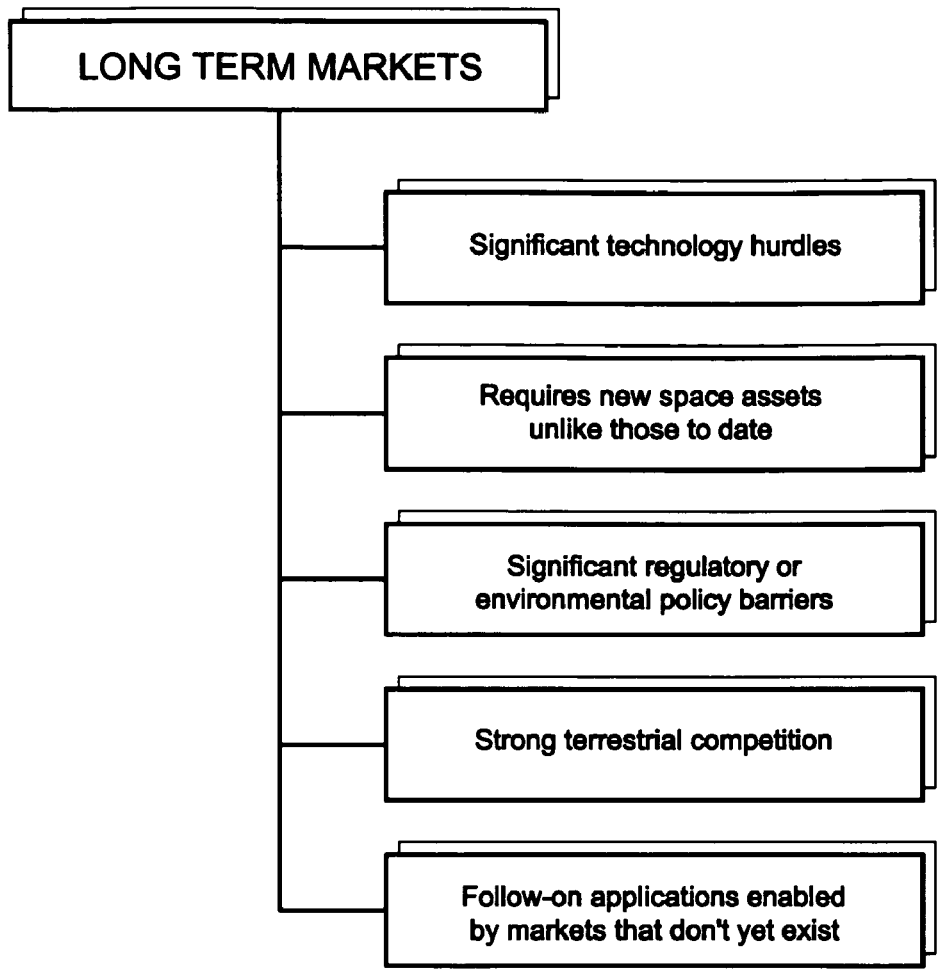
FIG. 16 is a chart of the ascent study long term markets.

FIG. 16 is a chart of the ascent study long-term markets. Depicted in FIG. 16 is a block diagram of long-term markets, as described in the ascent study. An objective of the spacecraft of the present invention is to provide means for increased capacity and improved long-term affordability in space transport of payload to support these needs.

FIG. 17 is a chart of the ascent study global markets (orbital). Depicted in FIG. 17 chart of global markets, both commercial and government classes as described in the ascent study. The study projections confirm the desire and need of affordable space transport of payload as intended with the spacecraft of the present invention.

FIG. 18 is a chart of the ascent study very long-term markets. Depicted in FIG. 18 is a chart of very long term markets, both commercial and government classes as described in the ascent study. The study describes projections of no launches evolving in 4 commercial market segments over next 20 years at current price levels. These finding further support the need of improved affordability in space transport of payload as intended with the spacecraft of the present invention.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various application without omitting features that, from the standpoint of prior art, fairly constitute essential characteristics of the generic or specific aspects of this invention.

What is claimed is:

1. A hydrogen-fueled spacecraft comprising:
   a) a spacecraft body;
   b) an interior region of said spacecraft;
   c) an exterior region of said spacecraft;
   d) a plurality of rocket thrusters disposed on the exterior of the peripheral circumference of said exterior region of said spacecraft;
   e) a plurality of solar panels disposed on the top portion of said exterior portion of said spacecraft;
   f) hydrogen gas to power said rocket thrusters;
   g) a centrally located rotating cylinder disposed within said interior region of said spacecraft capable of rotating at a speed sufficient to generate 1G of force therein to simulate the gravity on Earth; and
   h) a plurality of hydraulic cargo loading ramps peripherally disposed on said spacecraft.

2. A hydrogen-fueled spacecraft as recited in claim 1, wherein said body of said spacecraft is comprised of composite fiber.

3. A hydrogen-fueled spacecraft as recited in claim 2, wherein wherein said composite fiber is covered with a Kevlar 7 aramid fiber exterior skin.

4. A hydrogen-fueled spacecraft as recited in claim 3, wherein a Spaceloft material is applied as an undercoating between said composite fiber and said Kevlar exterior skin.

5. A hydrogen-fueled spacecraft as recited in claim 1, further including a plurality of fuel cells for providing energy to said spacecraft.

6. A hydrogen-fueled spacecraft as recited in claim 1, wherein said rocket thrusters are selectively rotatable to provide lift and maneuverability to said spacecraft.

7. A hydrogen-fueled spacecraft as recited in claim 6, wherein there are eight rocket thrusters on said spacecraft.

8. A hydrogen-fueled spacecraft as recited in claim 1, wherein said solar panels cover 90 percent of said top portion of said spacecraft.

9. A hydrogen-fueled spacecraft as recited in claim 1, wherein there are 4 evenly spaced cargo loading ramps on said spacecraft.

10. A hydrogen-fueled spacecraft as recited in claim 9, wherein said cargo loading ramps are substantially 15 feet tall by 20 feet wide.

11. A hydrogen-fueled spacecraft as recited in claim 1, wherein the interior of said rotating cylinder includes a first level, a second level, a third level and a fourth level.

12. A hydrogen-fueled spacecraft as recited in claim 11, wherein living quarters and cargo are contained on said fourth level.

13. A hydrogen-fueled spacecraft as recited in claim 1, wherein a plurality of hydrogen gas bags are disposed in a superior interior portion of said spacecraft external to said rotating cylinder.

14. A hydrogen-fueled spacecraft as recited in claim 1, wherein a plurality of oxygen cell bags are disposed in one side of an inferior, interior portion of said spacecraft external to said rotating cylinder.

15. A hydrogen-fueled spacecraft as recited in claim 1, wherein a plurality of hydrogen vapor cell bags are disposed in an inferior, interior portion of said spacecraft on the opposing side of said oxygen cell bags.

16. A hydrogen-fueled spacecraft as recited in claim 1, further including a plurality of electric motors to provide support to said spacecraft.

17. A hydrogen-fueled spacecraft as recited in claim 1, further including a plurality of cameras disposed to provide images of the area surrounding said spacecraft.

* * * * *